(12) United States Patent
Buchman et al.

(10) Patent No.: US 9,463,749 B2
(45) Date of Patent: Oct. 11, 2016

(54) DOOR-FRAME HOOK FOR SECURING VEHICLE ROOF-TOP LOADS

(71) Applicants: Yosef Buchman, Alfe Menashe, IL (US); Hagai Adiv, Maale Shomron, IL (US)

(72) Inventors: Yosef Buchman, Alfe Menashe, IL (US); Hagai Adiv, Maale Shomron, IL (US)

( * ) Notice: Subject to any disclaimer, the term of this patent is extended or adjusted under 35 U.S.C. 154(b) by 1 day.

(21) Appl. No.: 14/886,364

(22) Filed: Oct. 19, 2015

(65) Prior Publication Data

US 2016/0039352 A1    Feb. 11, 2016

Related U.S. Application Data

(63) Continuation of application No. PCT/IL2014/050369, filed on Apr. 22, 2014.

(60) Provisional application No. 61/813,657, filed on Apr. 19, 2013.

(51) Int. Cl.
*B60R 9/058* (2006.01)
*B60R 11/00* (2006.01)

(52) U.S. Cl.
CPC ........ *B60R 9/058* (2013.01); *B60R 2011/0059* (2013.01)

(58) Field of Classification Search
CPC ...................... B60R 9/058; B60R 2011/0059
USPC ........................................................ 224/329
See application file for complete search history.

(56) References Cited

U.S. PATENT DOCUMENTS

| 2,635,796 | A | * | 4/1953 | Davolt | B60R 9/00 224/42.31 |
| 4,253,594 | A | * | 3/1981 | Parks | B60R 9/048 224/318 |
| 5,267,681 | A | * | 12/1993 | Walter | B60R 9/058 156/307.1 |
| 5,335,836 | A | | 8/1994 | Waddell | |
| 5,823,412 | A | * | 10/1998 | Haug | B60R 9/058 224/309 |
| 5,865,356 | A | | 2/1999 | Arvidsson | |
| 6,213,696 | B1 | * | 4/2001 | Austin | B60N 2/2806 410/101 |

FOREIGN PATENT DOCUMENTS

CA            2098405 A1    3/1994

\* cited by examiner

*Primary Examiner* — Justin Larson
(74) *Attorney, Agent, or Firm* — Mark David Torche; Patwrite LLC

(57) ABSTRACT

There is disclosed a door-frame hook, for enabling a load strap, attached to a vehicle rooftop load carrier, to engage a door frame of the vehicle to secure the load carrier when the load strap is tightened. The hook may be anchored onto a frame ridge of the door frame and in part, covered by a sealer attached to the door frame. The door-frame hook of the invention may, advantageously, remain in position, between the frame-ridge of the door frame and the sealer potter, regardless of the degree of tightness of the load strap or the degree of its pull on the hook, as well as when the load strap is unattached. Moreover, it does not harm the door sealer nor does it interfere in any way with its sealing function or with the shutting action of the door.

7 Claims, 5 Drawing Sheets

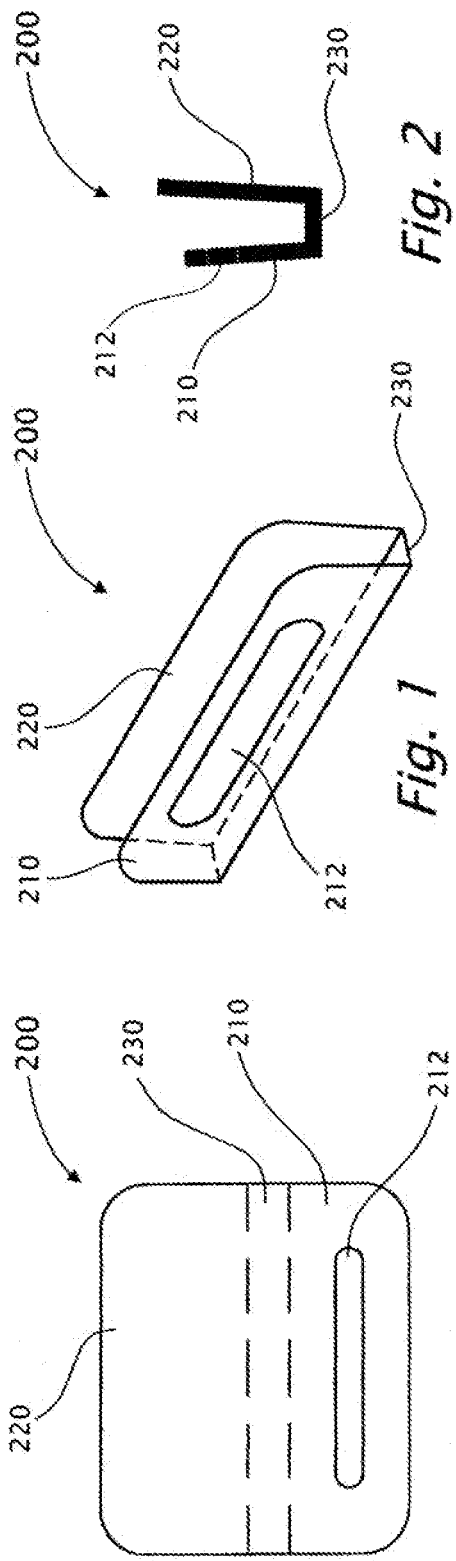
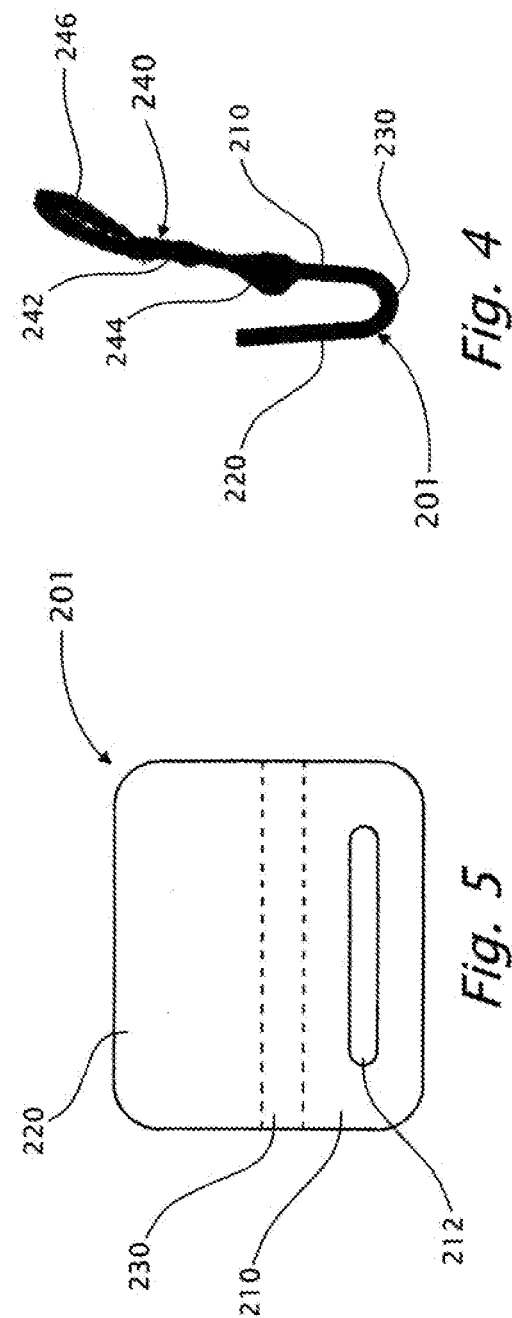

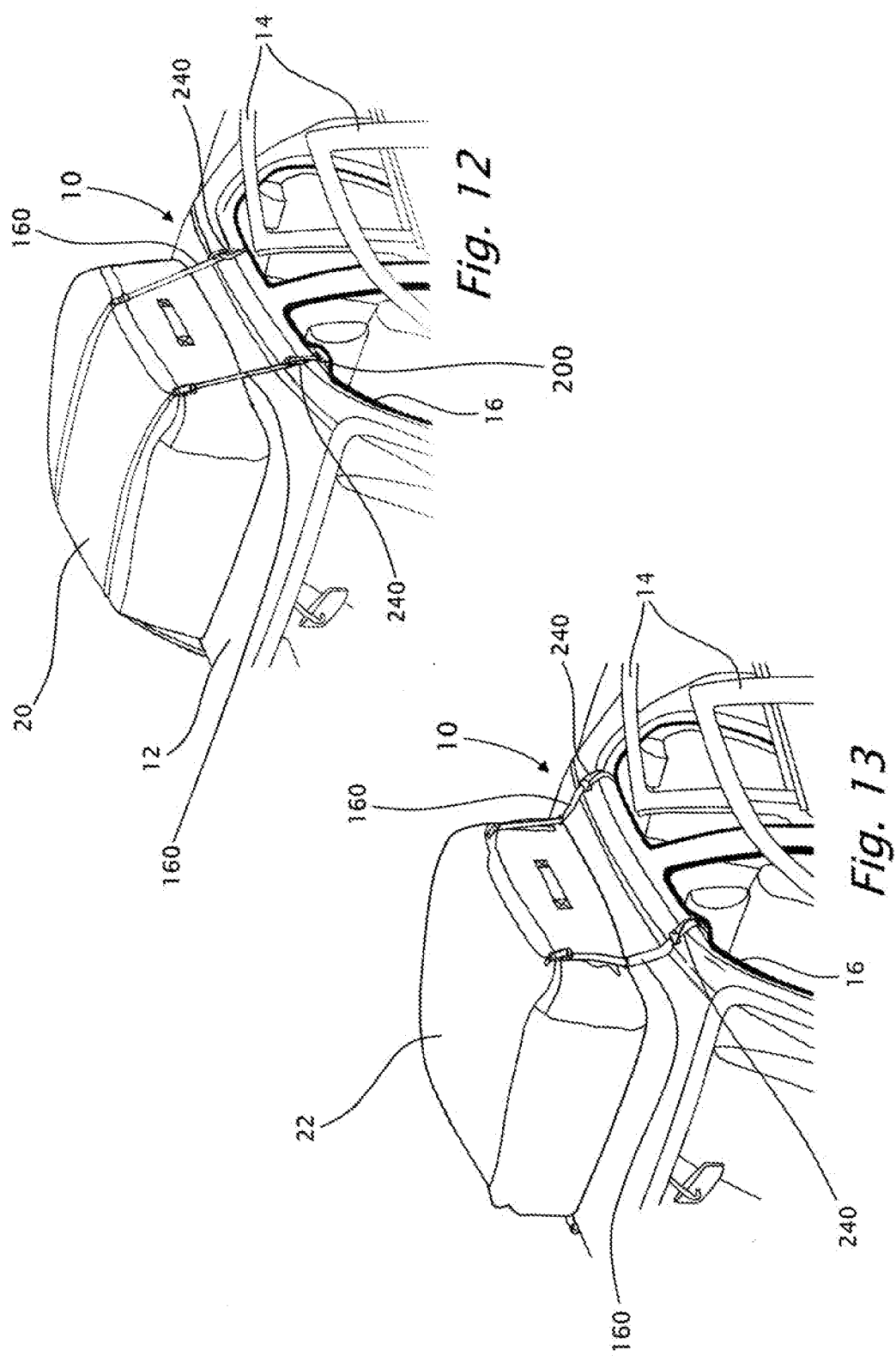

DOOR-FRAME HOOK FOR SECURING VEHICLE ROOF-TOP LOADS

CROSS REFERENCE TO RELATED APPLICATIONS

This Application is a U.S. national stage entry from co-pending International Patent Application Ser. No. PCT/IL2014/50350, filed Apr. 10, 2014. This Application is related to and claims priority also from U.S. provisional patent application 61/813,657, filed Apr. 19, 2013, the entire contents of both of which are hereby incorporated by reference.

BACKGROUND OF THE INVENTION

Roof-top load carriers for vehicles are well known. They typically include general-purpose racks, rigid enclosures, flexible racks or enclosures and a variety of special-purpose carriers, designed for specific types of equipment, such as bicycles, boats, ski boards etc. A load carrier may be referred to in the sequel interchangeably also as a "load" or a "carrier". These terms are also to be understood as including baggage not specifically designed to be carried on vehicle roof-tops, such as suitcases, bags and cartons.

All roof-top carriers and loads have a fundamental common need, namely to be safely secured to the body of the vehicle so that they remain in place during vehicle motion.

Generally such securing involves load straps that (a) are attached to the carrier or pulled over the load, (b) engage some holding part of the vehicle and (c) may be tightened and held tight by means of suitable buckles or the like. The particular holding part of the vehicle and the manner in which it is engaged by the load straps may be broadly classified into three types: (a) The holding parts are rails permanently attached to the roof-top and the load straps are simply wound around the rails or around special anchors attached to the rails; (b) the holding part is the entire roof and the load straps run through the vehicle's doorways and span the top of its interior space; (c) The holding parts are the tops of the vehicle's door-frames and the load straps engage them by means of special door-frame hooks.

Of the aforementioned three types, type 'a' is applicable only to vehicles that are equipped with suitable rails. Type 'b' has several drawbacks, including interference with the operation of side airbags, obtrusive presence of the load straps inside the vehicle and a predisposition to sideway slippage. Type 'c', to which the present invention relates, is applicable to practically all personal passenger vehicles (e.g. so-called sedans), as well as many other vehicle types, and generally overcomes the drawbacks enumerated above with regard to type 'b'. However the configuration of the special hooks and the manner in which they engage the doorframes, according to prior art, have several disadvantages, to be discussed below. It is noted that a vehicle doorframe is generally lined with a flexible strip, known as door sealer or "potter", which is fixedly attached to the door frame and serves to seal the doorway from outside air and water when the door is shut. According to prior art, the door-frame hook (which is attached to the load strap) is configured to engage the door sealer as part of the door frame; in other words, the hook is wide enough to fit over the sealer and is designed to press against it when the load strap is tightened.

The disadvantages of a door-frame hook of prior art and of the manner in which it engages the door frame include: (1) If the load strap becomes loose, for any reason, the hook may slip from the sealer and thus become disengaged, particularly if the door is opened even momentarily; this may cause the entire load to become unstable or even fall off the rooftop. (2) The considerable pressure exerted by the hook on the sealer may damage it, at least gradually, thus reducing its effectiveness. (3) The relatively large width of the hook, combined with its structurally-necessitated greater massivity, may interfere with the tightness of contact between the sealer and the door, thus again reducing sealing effectiveness, or even necessitating greater force to shut the door.

Thus there is a need for, and it would be advantageous to have, a means for engaging the load straps of roof-top load carriers to the door frame of a vehicle that will be devoid of the aforementioned disadvantages.

SUMMARY OF THE INVENTION

The principal objective of the present invention is to improve the manner in which a load carrier is secured onto a vehicle roof-top, by providing means for a load strap, attached to the load or load carrier, to engage a door-frame of the vehicle in a manner that avoids the drawbacks of prior art. According to the teachings of the present invention there is provided a door-frame hook, attachable to a load strap that is configured to be directly anchored, or mounted, onto the frame-ridge of the door frame and to be covered by the door sealer ("rubber potter"). The door-frame hook may remain in position, between the frame-ridge of the door frame and the rubber potter, regardless of the degree of tightness of the load strap or the degree of its pull on the hook, as well as when the load strap is unattached. The door-frame hook of the invention may be easily mounted on, or removed from, the frame-ridge of the door frame and does not interfere in any way with the sealing function of door sealer or with the shutting action of the door.

More specifically, there is provided according to the present invention a door-frame hook, for enabling a load strap, attached to a roof-top load carrier, on a vehicle, to engage a door frame of the vehicle so as to secure the load carrier onto the vehicle when the load strap is tightened, the hook being configured so that it may be anchored onto a frame ridge of the door frame and thereafter be, in part, covered by a sealer attached to the door frame and further configured so that the load strap may be attached thereto.

In some embodiments the door-frame hook includes a slot for threading the load strap therethrough. In other embodiments the door-frame hook includes a tying strap or a tying ring for threading the load strap therethrough. A feature of a door-frame hook according to the invention is that it remains anchored onto the frame ridge even when the load strap is loose or absent. Other features of the door-frame hook are that, while anchored onto the frame ridge, it essentially does not interfere with shutting of the corresponding door of the vehicle; it may be totally invisible when the corresponding door of the vehicle is shut and it causes no damage to the sealer nor does it interfere with its sealing function.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 1 is a front-top perspective view illustration of a door-frame hook, according to embodiments of the present invention.

FIG. 2 is a side view illustration of the door-frame hook shown in FIG. 1.

FIG. 3 is a flat layout of the door-frame hook shown in FIG. 1, before being bent into its shape.

FIG. 4 is a side view illustration of a variation of the door-frame hook shown in FIG. 1, having a tying strap attached thereto.

FIG. 5 is a flat layout of the door-frame hook shown in FIG. 4, before being erected.

FIGS. 12 and 13 illustrate examples of securing a suitcase or a large bag onto the roof top of a vehicle, according to embodiments of the present invention.

DETAILED DESCRIPTION OF THE INVENTION

Figure 7:
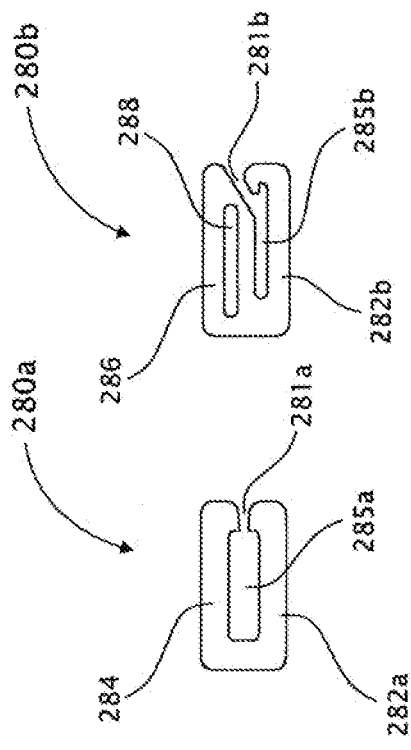
FIG. 7 illustrates two versions of mediating buckles, having a generally U-shaped body.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thoroughly and completely understood by those skilled in the art.

An embodiment is an example or implementation of the invention. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as those to which the invention belongs, unless otherwise defined. The present invention can be implemented in testing or in practice with methods and materials equivalent or similar to those described herein.

Reference is now made to the drawings. FIG. 1 is a front-top perspective view illustration of a door-frame hook 200, according to embodiments of the present invention. FIG. 2 is a side view illustration of door-frame hook 200 and FIG. 3 is a flat layout of door-frame hook 200, before being bent into shape.

Door-frame hook 200 is U-shaped and includes an external wall 210, an internal wall 220 and a base 230, interconnecting the generally parallel external wall 210 and internal wall 220. Base 230 may be a flat spacer, as shown in FIG. 2, a pointing edge (not shown), rounded or a combination thereof. FIG. 4 is a side view illustration of a door-frame hook 201, according to variations of the present invention, having a rounded base 230, and FIG. 5 is a flat layout of door-frame hook 201, before being bent into shape.

External wall 210 has a slot 212 formed therein, configured to accommodate a load strap inserted therethrough. FIG. 4 illustrates a door-frame hook 201 having a tying strap 240 attached thereto. The tying strap 240 is generally shaped as a loop and may be made of any suitable flexible material; preferably its length is relatively short. One end-loop 244 of tying strap 240 is permanently threaded through slot 212, while its seconded-loop 246 is left open so as to accommodate the load strap, reaching from the vehicle roof-top carrier or load, as further explained below.

Figure 6:
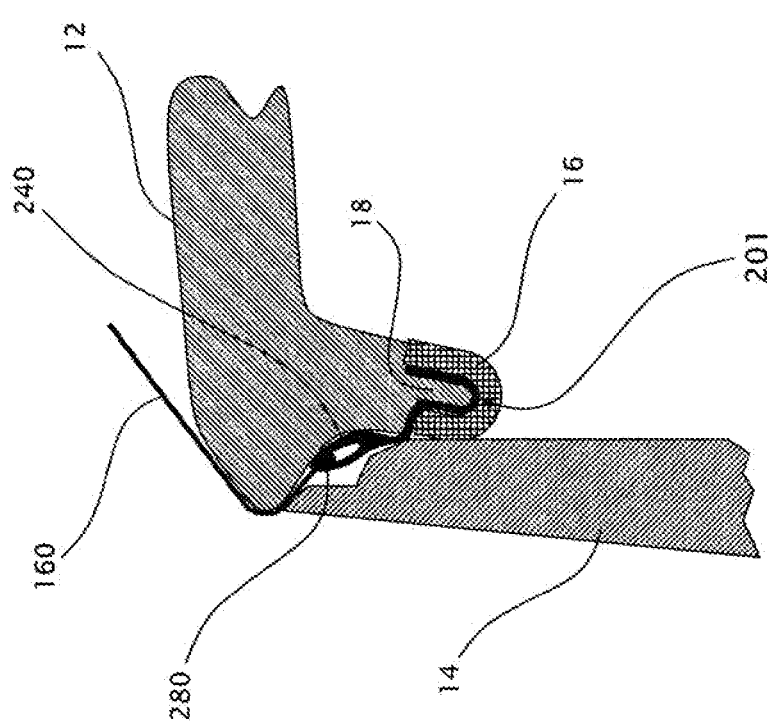
FIG. 6 is a cross section view of a vehicle door frame, having door-frame hook, as shown in FIG. 4, anchored onto the frame-ridge of the door frame and covered by a rubber potter.

FIG. 6 is a cross section view of a vehicle door frame, having a door-frame hook 201 (depicted in FIG. 4) anchored onto the frame-ridge 18 of the door frame and covered, in part, by the sealer (rubber potter) 16. Typically, door-frame hook 201 is anchored onto the portion of the frame-ridge 18, at least part of which is a continuous extension of the vehicle roof 12. After assembly, door-frame hook 201 is disposed adjacent to frame-ridge 18, stopped by base 230, and rubber potter 16 is placed back adjacently to the external surfaces of door-frame hook 201. In the example shown in FIG. 6, tying strap 240 is disposed in the space between the upper section of the vehicle door 14 and the door frame. Load strap 160 passes through the second end-loop 246 of the tying strap or is tied thereto.

There are a number of alternative ways to attach strap 160 to end-loop 246. In one embodiment, a mediating buckle is used. FIG. 7 illustrates two versions of a mediating buckle 280, having a generally flat U-shape body, including a first arm 282 and a second arm 284 or 286. According to the version marked 280a, the end-loop is wrapped about one arm and the load strap is wrapped about the other arm. In version 280b, a slot 288 is formed within arm 286, through which the load strap may pass.

Figure 8:
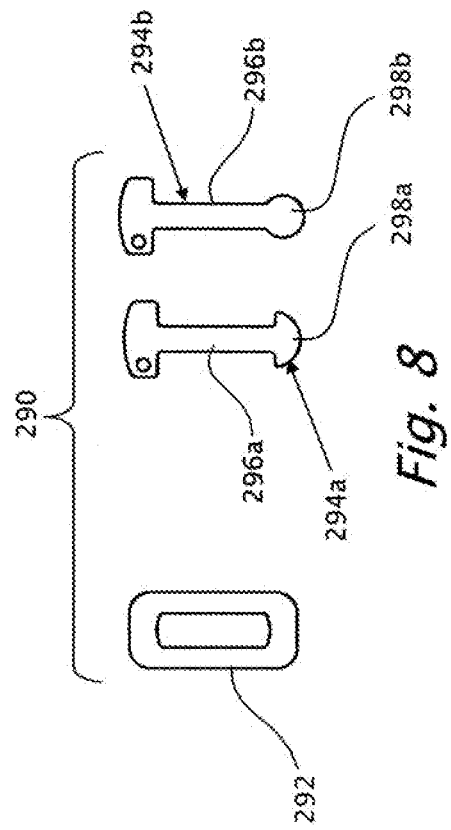
FIG. 8 illustrates an oblong mediating buckle, having an enclosed oblong shape ring and a locking arm.

In another embodiment, illustrated in FIG. 8, a mediating buckle 290 includes an oblong ring 292 and an anchor 296, which is longer than of the opening formed inside oblong ring 292. Second-end-loop 246 is threaded through oblong ring 292. In one variation, strap 160 includes a loop (not shown) that is also inserted through oblong ring 292, and then anchor 294, is inserted through the strap 160 loop, which strap is then pulled back to interlock it with tying strap 240.

In another variation, load strap 160 has no loop at its leading end. The leading end is inserted through the opening inside oblong ring 292, and then inserted back through the opening inside oblong ring 292, in the other direction, to form a loop, anchor 294, is inserted through the just formed loop, and then strap 160 is pulled to interlock it with oblong ring 292 and thereby with tying strap 240. It should be noted, for the sake of clarity, that other ways and devices known in the art may be used to interlock load strap 160 with tying strap 240.

In other embodiments, a door-frame hook 200 (as described above and illustrated in FIGS. 1 and 2) may be attached to load strap 160 by running the latter through slot 212 and tightening it by any provided means.

Figure 9:
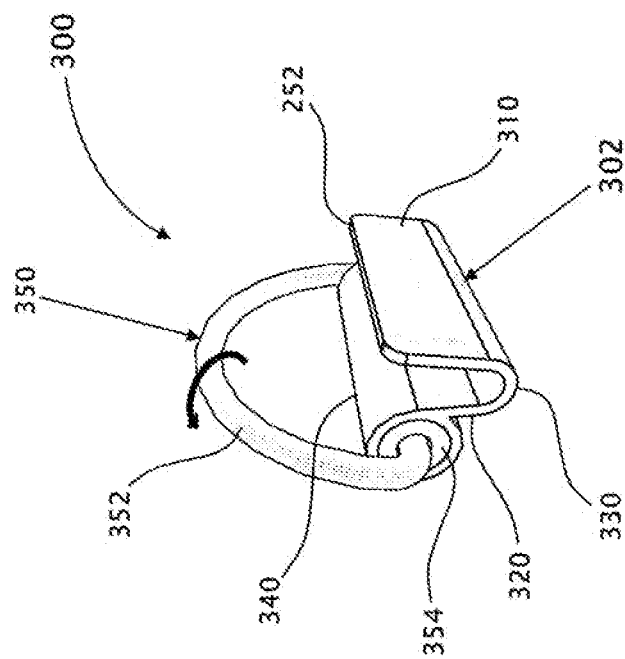
FIG. 9 is a perspective view illustration of another variation of a door-frame hook, having a tying loop integrated therein.
Figure 10:
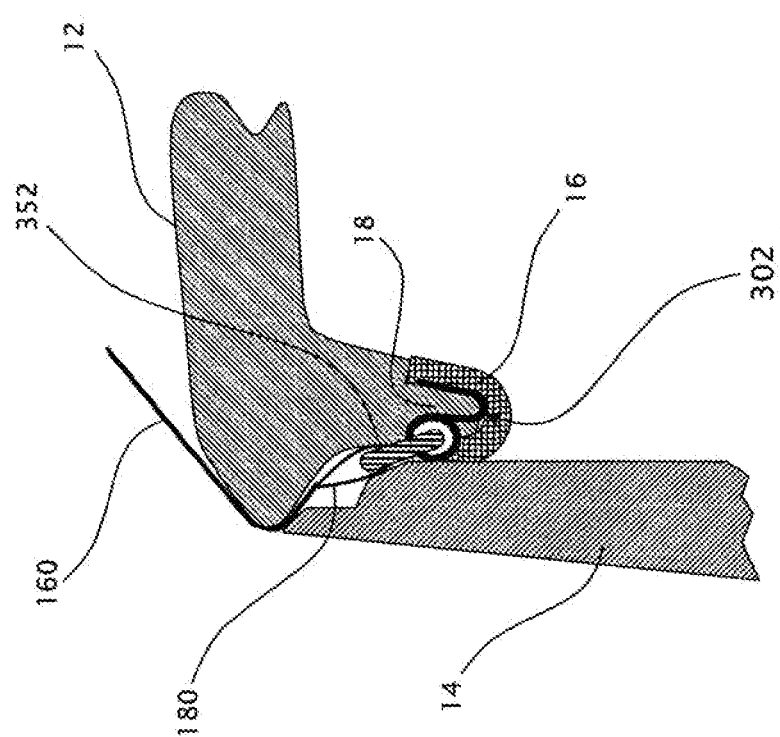
FIG. 10 is a cross section view of a vehicle door frame, having door-frame hook, as shown in FIG. 9, anchored onto the frame-ridge of the door frame of a vehicle.

FIG. 9 is a perspective view illustration of another embodiment of a door-frame hook according to the present invention, namely door-frame hook 300, having a tying ring 350 integrated therein. Door-frame hook 300 is generally U-shaped and, similarly to hooks 200 and 201 (FIGS. 1-5), includes an external wall 310, an internal wall 320 and a base 330, interconnecting the generally parallel, external wall 310 and internal wall 320. Base 330 may be a flat spacer, as shown in FIG. 2, a pointing edge (not shown), rounded or a combination thereof. Internal wall 320 further includes a tubular connector 340 adapted to securely enclose a bearing 354. Tying ring 350 is pivotally attached to bearing 354 and is configured to accommodate a load strap threaded FIG. 10 is a cross section view of a vehicle door frame, having a door-frame hook 300 anchored onto the frame-ridge 18 of the door frame and covered by the rubber potter 16. Typically, door-frame hook 300 is anchored onto the portion of the frame-ridge 18, at least part of which is a continuous extension of the vehicle roof 12. After assembly, door-frame hook 300 is disposed adjacent to frame-ridge 18, stopped by base 330, and rubber potter 16 is placed back adjacently to the external surfaces of door-frame hook 300. In the example shown in FIG. 10, load strap 160 is passed through tying ring 350, forming a loop 180.

The operation of mounting a door-frame hook according to the present invention onto a vehicle door frame and using it to secure any roof-top load or carrier onto the roof-top of the vehicle Will now be described, with reference to FIGS. 11a-11f, in terms of a sequence of steps, by way of example. The sequence is applicable essentially to any door-frame hook according to the invention, such as those described above (200, 201 and 300) with reference to FIGS. 1-10, although, by way of example, the description is in terms of, and the illustrations depict, the configuration of door-frame hook 201.

Operation begins by grabbing the rubber potter 16 at a selected location (step 410, see FIG. 11a), whereabouts the door-frame hook is to be anchored. It then proceeds with the following steps: Step 420: pulling down rubber potter 16.

Figure 11A:
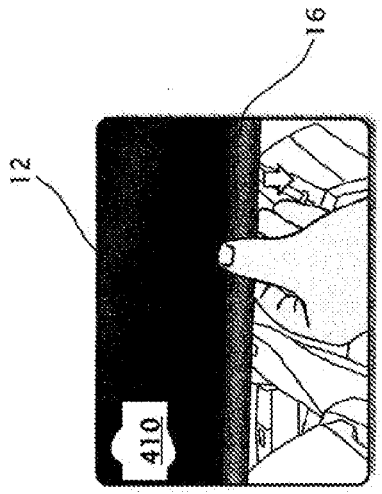
FIGS. 11a-11f demonstrate the sequence of steps for anchoring a door-frame hook of the present invention onto the frame-ridge of the door frame.
Figure 11D:
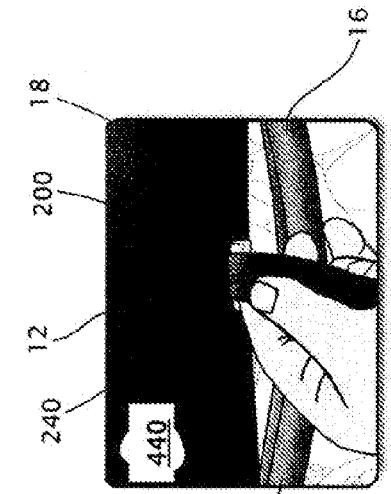
Figure 11B:
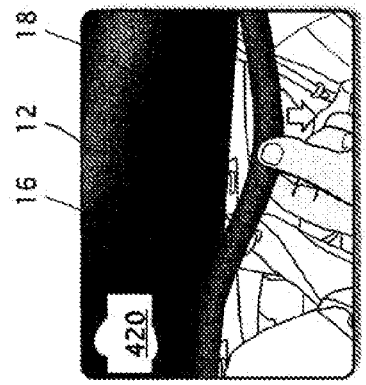

As shown in FIG. 11b, the user pulls rubber potter 16 down slightly, to expose a section of frame-ridge 18, whereabouts the door-frame hook is to be anchored.

Step 430: holding door-frame hook/strap 240 in position.

Figure 11E:
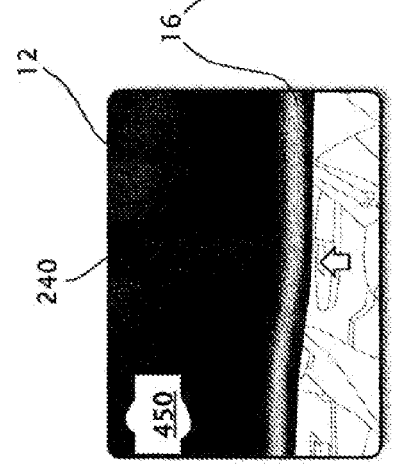
Figure 11C:
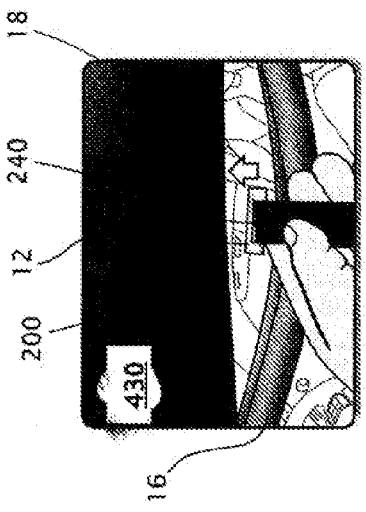

As shown in FIG. 11c, the user holds the door-frame hook in a position facing the frame ridge at the selected location, wherein strap 240 faces the exterior of the vehicle.

Step 440: placing door-frame hook/strap 240 in position.

As shown in FIG. 11d, the user pushes the door-frame hook upwardly to engage the frame ridge until stopped by its base 230 or by the door frame.

Step 450: replacing rubber potter 16.

As shown in FIG. 11e, the user pushes rubber potter 16 back to its normal position, typically covering the door-frame hook.

Figure 11F:
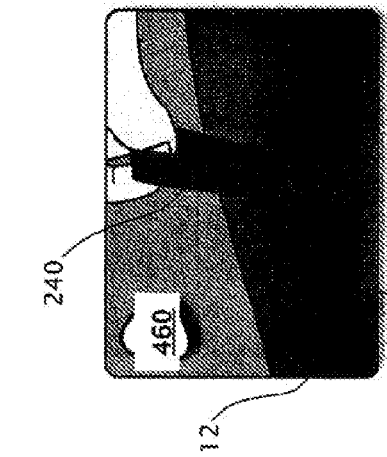

The operation ends with step 460, as shown in FIG. 11f, wherein second end-loop 246 of tying strap 240 (or, alternatively, slot 212 in the case of door-frame hook 200 or tying ring 350 in the case of door-frame hook 300) is now exposed and ready for attachment thereto of load strap 160. Thereupon the load strap is typically passed through or tied to second end-loop 246 (or the alternatives mentioned above) and tightened, to secure the load or load carrier onto the roof top.

It is noted that, advantageously, door 14 may be closed normally and that, further advantageously, no damage is inflicted on rubber potter 16. It is also noted that the doorframe hook may, advantageously, be left anchored onto the frame-ridge of the door frame even when the load strap becomes loose or when no load strap is attached thereto (for example, when the load carrier is removed).

Tying strap 240 of door-frame hook 201 may be designed so that second end-loop 246 is left behind the closed door 14, as shown in FIG. 6, or may be kept outside the vehicle, when door 14 is closed, as shown in FIG. 11f, or any other design or usage. Similarly, outside wall 210 of door-frame hook 200, as well as tying ring 350 of door-frame hook 300, remains generally hidden behind closed door 14.

Using door-frame hooks of the present invention, a variety of roof-top loads and load carriers can be secured to the roof-top 12 of a vehicle 10, including, but not limited to, a roof-rack, a bicycle rack, a ski rack, a tent, rigid or soft stowage containers and luggage items, such as bags and suitcases. FIGS. 12 and 13 illustrate examples of securing a suitcase or a large bag (20, 22) onto roof top 12 of a vehicle 10. Bag 20 is held tight using external load straps 160 while bag 22 has load straps 160 attached to, or integrated with the bag. In these examples, load straps 160 are tightened to loops 246 of tying straps 240. In variations of the present invention, the door-frame hooks (200, 201 or 300) are an integral part of load straps 160, which also include each a tightening mechanism.

The invention has thus been described in terms of embodiments and examples, but it will be obvious that these may be varied in many other ways. Such variations are not to be regarded as a departure from the spirit and scope of the invention, and all such modifications as would be obvious to one skilled in the art are intended to be included within the scope of the invention as represented by the claims hereunder.

What is claimed is:

1. A vehicle engagement device, for use in combination with a load strap that is attachable to a roof-top load carrier on a vehicle having a roof extension with a ridge and a seal fittable on said ridge, the device comprising:
   a ridge-engaging hook having a lower portion configured to correspond to and be anchorable on the ridge and be at least partially disposed underneath the seal; and
   a tying member that is pivotally or flexibly attached to an upper portion of the hook and the tying member is configured so that a load strap can be threaded therethrough, the tying member being dimensioned such that it does not extend beyond an upper portion of a corresponding door of the vehicle whereby the tying member as well as the entire device is completely concealed when the corresponding door of the vehicle is shut.

2. The device as in claim 1, the tying member comprises a slot configured for threading said load strap therethrough.

3. The device as in claim 1, being configured so that it remains anchored onto said ridge even when said load strap is loose or absent.

4. The device as in claim 1, being configured so that, while anchored onto said ridge, the hook causes no damage to said seal nor does it interfere with the sealing function thereof.

5. The device as in claim 1, wherein the tying member is a tying strap.

6. The device as in claim 1, wherein the tying member is a tying ring.

7. The device as in claim 6, wherein the hook includes a tubular connector (340) adapted to securely enclose a bearing (354) to which the tying ring (350) is pivotally attached.

\* \* \* \* \*